United States Patent [19]

Marsh

[11] 3,836,897

[45] Sept. 17, 1974

[54] CIRCULAR MAGNETIC DOMAIN DEVICES

[75] Inventor: Anthony Marsh, Blisworth, England

[73] Assignee: Plessey Handel und Investments A.G., Zug, Switzerland

[22] Filed: Oct. 6, 1972

[21] Appl. No.: 295,785

[30] Foreign Application Priority Data

Oct. 13, 1971 Great Britain .................... 47621/71

[52] U.S. Cl.... 340/174 TF, 340/174 MS, 333/30 M

[51] Int. Cl. .......................... G11c 11/14, G11c 19/00

[58] Field of Search. 340/174 TF, 174 MS, 174 VB; 333/30

[56] References Cited

UNITED STATES PATENTS

| | | | |
|---|---|---|---|
| 3,434,119 | 3/1969 | Onyshkevych | 340/174 VB |
| 3,484,759 | 12/1969 | Hadden, Jr. | 340/174 VB |
| 3,618,134 | 11/1971 | Smith | 333/30 M |
| 3,673,582 | 6/1972 | Clover, Jr. | 340/174 TF |
| 3,696,312 | 10/1972 | Kuhn | 333/30 M |

*Primary Examiner*—Stanley M. Urynowicz, Jr.
*Attorney, Agent, or Firm*—Scrivener Parker Scrivener & Clarke

[57] ABSTRACT

A circular magnetic domain device wherein propagating circular magnetic domains are detected by causing the domains to interact with a wave, i.e., a magnetic wave or an acoustic wave, generated in, or on the surface of, a layer of uniaxial magnetic material within which the domains are generated and caused to propagate. Interaction of a domain with the wave causes the wave to be attenuated, amplified, phase shifted or distorted.

11 Claims, 3 Drawing Figures

CIRCULAR MAGNETIC DOMAIN DEVICES

Figure 1:
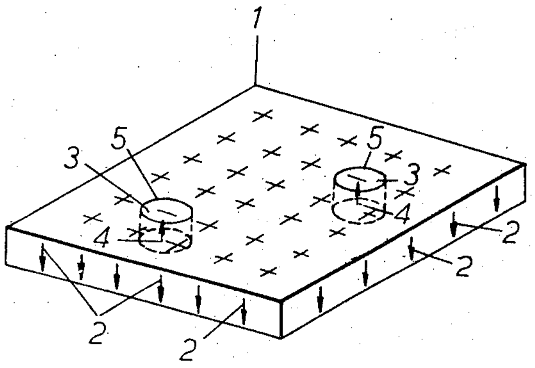

The invention relates to circular magnetic domain devices and in particular to circular magnetic domain detectors for such devices.

Known circular magnetic domain devices include a thin layer of uniaxial magnetic material, for example, orthoferrite, which possesses a single unique easy magnetisation direction that is substantially normal to the thin magnetic layer. It is possible for the thin magnetic layer to possess a positive magnetic vector at all points except for a few small circular regions, called magnetic domains or magnetic bubbles, within which the magnetic vector is negative. It should be noted that the polarities positive and negative are only arbitrarily assigned. The cylindrical internal surface forming the boundary between each of the magnetic domains and the remainder of the magnetic material of the thin layer are termed domain walls, or, more explicitly 180° Bloch walls. The magnetic domains or bubbles are generated and made to propagate within the thin magnetic layer in a manner which is described by A.H. Bobeck et al in the I.E.E.E. Transactions on Magnetics, Volume MAG. 5, No. 3, September 1969 at pages 544 to 565.

Magnetic shift registers and magnetic serial information stores can be based on circular magnetic domains since these domains have the important properties that they are permanent and maintain a consistent size, and that they possess high lateral mobility across the thin layer of magnetic material, and they can, therefore, move at high speeds when subjected to a magnetic field gradient. The diameter of the circular magnetic domains must be small i.e. in the range 2 to 10 $\mu$m, for the data storage devices, and the magnetisation of the material of the thin uniaxial magnetic layer will, in practice, be quite low, i.e., in the range 100 to 800 gauss, and, therefore, the electrical signal that can be obtained from the detection of a circular magnetic domain by either an electromagnetic, a field sensitive, or a magnetoresistive domain detection device will also be small. Also, in data storage devices of this type, the "latency" i.e. the time delay between the commanding of a particular block of data from a serial store and the receiving of the first part of the block at the domain detection device, of the thin uniaxial magnetic layer can give rise to problems in the design of the circular magnetic domain memory circuits.

It is an object of the present invention to provide a circular magnetic domain detector which provides an electrical output that is practically independent of the magnetisation of the uniaxial magnetic layer of the device and allows circuit designs to be used which provide a small latency.

The invention provides a circular magnetic domain device including a layer of uniaxial magnetic material having a single unique easy magnetisation direction substantially normal to a major surface thereof; generation means for generating circular magnetic domains within the said layer; propagation means for causing the circular magnetic domains to propagate along at least one path in the said layer; and detection means for detecting the propagating domains by causing the domains to interact with a wave generated in, or on the surface of, the said layer.

Figure 2:
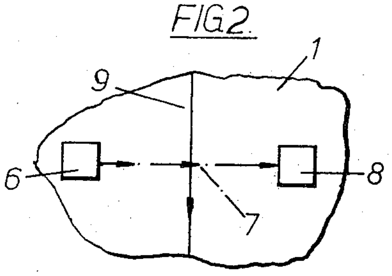
Figure 3:
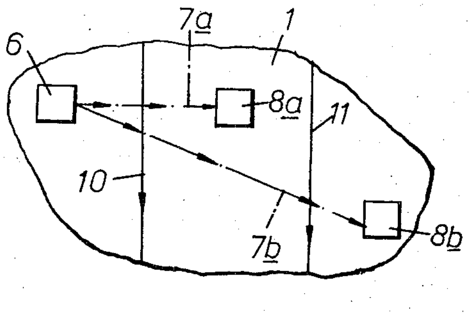

The foregoing and other features according to the invention will be better understood from the following description with reference to the accompanying drawings, in which:

FIG. 1 diagrammatically illustrates the basic principles of a circular magnetic domain device, FIG. 2 diagrammatically illustrates a plan view of part of a circular magnetic domain device according to the invention, and FIG. 3 diagrammatically illustrates a plan view of part of another circular magnetic domain device according to the invention.

Referring to FIG. 1 of the drawings, which illustrates the basic principles of a circular magnetic domain device, a thin layer 1 of uniaxial magnetic material, for example orthoferrite, is illustrated, which possesses a single unique easy magnetisation direction substantially normal to a major surface of the layer. It is possible, as previously stated, for the magnetic layer 1 to possess a positive magnetic vector 2 at all points except for a few small circular regions 3 called magnetic domains, within which the magnetic vector 4 is negative. The cylindrical internal surface 5 forming the boundary between the domains 3 and the remainder of the material of the layer 1 forms a domain wall, or, more explicityly, a 180° Bloch wall. As previously stated, the polarities positive and negative are arbitrarily assigned and should, therefore, not be considered as a limitation.

The magnetic domains can, as is described in the previously cited I.E.E.E. Transactions, be caused to propagate along the magnetic layer 1 and can be utilised to effect a serial data storage function or data switching function if facilities exist whereby a binary pattern of circular magnetic domains can be transferred from one propagation path to another propagation path.

In magnetic materials having a low loss component in the magnetic permeability, it is known that a magnetic vector disturbance in orientation at a point or region of the magnetic material can be generated by means of a suitable transducer. In ferromagnetic materials, the vectors in disturbance are coupled to the neighbouring vectors and as a consequence, the disturbance is radiated through the ferromagnetic material as a wave, i.e., a spin wave or a magnetoacoustic wave. This wave can be detected at any desired point along its propagation path by means of another transducer which may be similar in design to the transducer used to generate the origin disturbance.

Physical or magnetic inhomogeneities in the magnetic material disturb the propagation of the wave. For example, a pore, or a boundary in the magnetic material will cause the wave to scatter or be deflected.

In the circular magnetic domain device outlined in a preceding paragraph, the thin layer nature of the uniaxial magnetic layer 1 will confine a wave of the kind outlined in preceding paragraphs to the layer 1. Under certain conditions the wave amplitude may be concentrated near to one of the surfaces of the layer 1.

A circular magnetic domain which, as previously stated, involves 180° rotation of the magnetic vectors in a small region of the uniaxial magnetic layer 1, constitutes a magnetic inhomogeneity and is, therefore, capable of causing a wave propagating through the uniaxial magnetic layer 1 to be reflectd, scattered or diffracted on being interacted with the wave.

Thus, as illustrated in FIG. 2 of the drawings which diagrammatically illustrates a plan view of part of a circular magnetic domain device according to the invention, circular magnetic domain detection can be achieved by an arrangement which includes a magnetic wave generating transducer 6, a magnetic wave detection transducer 8 and means for causing a magnetic wave issuing from the transducer 6 to be concentrated along at least one specific path 7 in the layer 1. The magnetic wave detection transducer 8 is provided and used to detect the wave issuing from the transducer 6. The magnetic wave issuing from the transducer 6 may be concentrated at two or more detectors, i.e., as is diagrammatically illustrated in FIG. 3 of the drawings. The magnetic wave issuing from the transducer 6 of FIG. 3 is concentrated along two paths *7a* and *7b* and detected by two detection transducers *8a* and *8b* respectively.

With the arrangements of FIGS. 2 and 3 the wave received at a detection transducer will be attenuated, amplified, phase shift or distorted when one or more circular magnetic domains lie on any one of the paths 7, *7a*, and *7b*. For example, circular magnetic domains propagating along a path 9 in the arrangement of FIG. 2 will on interaction with the magnetic wave issuing from the transducer 6 effect a change in the magnetic wave received by the transducer 8, the change in the received signal constituting detection of one or more circular magnetic domains. The signal change is received at the transducer 8 with a time delay corresponding to the distance travelled along the path 7 after interaction with a circular magnetic domain or domains, and the velocity of the wave along the path 7. Since typical magnetic wave velocities are in the range $10^5$ to $10^6$ cm/sec. and typical magnetic domain velocities are in the range $10^3$ to $10^4$ cm/sec. a considerable reduction in latency is achieved. The signal received at the transducer 8 may be a continuous wave of frequency, depending on material parameters, in the range 50 to 800 MHZ or according to utilisation of the transducer 6 may be a series of continuous wave bursts or packets. The signal may readily be electronically processed to yield the required signal present in the waveform as a change in amplitude, distortion or phase shift.

In the arrangement of FIG. 3, the transducer *8a* is utilised to detect circular magnetic domains propagating along a path 10, and the transducer *8b* is utilised to detect circular magnetic domains propagating along the path 10 and/or a path 11.

It is known that under certain critical applied field conditions acoustic waves can have the same wavelength as magnetic waves and that a disturbance originally radiated acoustically can be converted into magnetoacoustic waves thence into magnetic waves.

In a circular magnetic domain device the bias field conditions which cause circular magnetic domain stability are normally less than the critical applied field conditions, but when this bias field is combined with the field distribution within and in the region of a circular magnetic domain, the field conditions can be such that conversion from acoustic to magnetic waves can be effected.

Thus, in another arrangement of the circular magnetic domain device according to the invention, the generating transducer, i.e., the transducer 6 of FIG. 2 and 3, is an acoustic wave generating transducer and the bias field and the circular magnetic domain field distribution conditions are arranged such that the generated acoustic waves are converted into magnetic waves prior to the waves being interacted with the circular magnetic domains which are to be detected. Interaction of a circular magnetic domain with a magnetic wave will produce the same result irrespective of whether the wave is of acoustic origin or not. There will be a reversion of these magnetic waves to magnetoacoustic waves and possibly wholly to acoustic waves in those regions of the uniaxial magnetic layer 1 where the applied field conditions permit. Therefore, the type of detection transducer or transducers, i.e., the transducer 8, *8a* and *8b* of FIGS. 2, and 3, that is or are utilised will be dependent on the surrounding applied field conditions and the location of each of the transducers on the uniaxial magnetic layer i.e. its position relative to the point at which the circular magnetic domains are detected.

It should, however, be noted, that a circular magnetic domain can be detectably interacted directly with an acoustic wave. This, therefore, allows an acoustic wave generating transducer 6 to be utilised in the arrangement outlined in the preceding paragraphs to detect the presence of circular magnetic domains when the field conditions are less than the critical field conditions, i.e., when conversion from acoustic waves to magnetic waves cannot be effected.

In a further arrangement of the circular magnetic domain device according to the invention, circular magnetic domain detection is achieved by arranging for the combined effects of the bias field which causes domain stability and the field distribution within and in the region of a circular magnetic domain that is being detected to either specifically promote or inhibit a conversion from one type of wave to another type of wave, detection of the wave types indicating the presence or absence of a circular magnetic domain or domains. For this arrangement the detection transducer would need to be suitable for either acoustic, magnetoacoustic or magnetic waves, not necessarily in a general or specific sense, depending on the type of interaction that is utilised.

In practice, each of the propagation paths 9 to 11 would be defined by a permeable circuit (not illustrated) that is constituted by a pattern of a soft magnetic material, for example, isotropic Permalloy formed on or in a major surface of the uniaxial magnetic layer 1.

The paths along which the acoustic and magneto acoustic waves are to be concentrated are defined by a specific pattern (not illustrated) of a material which has elastic properties that are dissimilar to the elastic properties of the garnet material of the uniaxial magnetic layer 1. The specific pattern would be formed on the major surface of the layer 1 and would cause the propagating acoustic or magnetoacoustic waves to be refracted, scattered or diffracted in the layer 1. Typical examples of the materials which can be utilised for this pattern are silica, nickel and nickel-iron. In the case of the magnetic and magnetoacoustic waves the concentration can be effected by forming in a known manner a specific pattern in the surface topography of the uniaxial magnetic layer which is such that the propagating magnetic or magnetoacoustic waves are caused to be refracted scattered or diffracted in the layer 1.

It can, therefore, be seen from the foregoing that the waves that are utilised to effect the detection of a circular magnetic domain can be either surface waves or bulk waves, i.e., within the thin uniaxial layer 1.

It should be noted that when the generating and detection transducer are situated in close proximity to each other it may not be necessary to effect wave concentration because the length of the path along which the generated wave will travel will be relatively short.

It is to be understood that the foregoing description of specific examples of this invention is made by way of example only and is not to be considered as a limitation in its scope.

What is claimed is:

1. A circular magnetic domain device including a layer of uniaxial magnetic material having a single unique, easy magnetisation direction substantially normal to a major surface thereof; generation means for generating circular magnetic domains within the said layer; propagation means for causing the circular magnetic domains to propagate along at least one path in the said layer; and detection means for detecting the propagating domains by causing a generated wave to follow a path in the said layer which intercepts at least one domain propagation path and to thereby cause the propagating domains to interact with the generated wave.

2. A circular magnetic domain device as claimed in claim 1 wherein the detection means include a generating transducer associated with the said layer for generating the said wave, the generated wave following a path which intercepts at least one domain propagation path; and a detection transducer for detecting the wave after it intercepts the said at least one domain propagation path.

3. A circular magnetic domain device as claimed in claim 2 wherein the combined effects of the field distribution near to, and within the propagating circular magnetic domains and the domain stabilising field are arranged to inhibit a conversion from one type of wave to another type of wave, and wherein the detection transducer is adapted to detect acoustic waves, magnetoacoustic waves and magnetic waves, the wave type detected indicating the presence or absence of a circular magnetic domain.

4. A circular magnetic domain device as claimed in claim 2 wherein the generating transducer is adapted to generate magnetic waves in the said layer and wherein the detection transducer is adapted to detect the magnetic waves and any changes therein.

5. A circular magnetic domain device as claimed in claim 2 wherein the generating transducer is adapted to generate acoustic waves in the said layer, the combined effects of the field distribution near to, and within the propagating circular magnetic domains and the domain stabilising bias field being arranged to convert the acoustic waves into magnetic waves before the waves intercept the said at least one domain propagation path, wherein the magnetic waves, after propagation path interception, revert to magnetoacoustic waves and then substantially wholly to acoustic waves, and wherein the detection transducer, depending on its position relative to the point of path interception, is adapted to detect either magnetic waves, magnetoacoustic waves or acoustic waves.

6. A circular magnetic domain device as claimed in claim 2 wherein the generating transducer is adapted to generate acoustic waves in the said layer, and wherein the detection transducer is adapted to detect the acoustic waves and any changes therein.

7. A circular magnetic domain device as claimed in claim 2 wherein the combined effects of the field distribution near to, and within the propagating circular magnetic domains and the domain stabilising field are arranged to promote a conversion from one type of wave to another type of wave, and wherein the detection transducer is adapted to detect acoustic waves, magnetoacoustic waves and magnetic waves, the wave type detected indicating the presence or absence of a circular magnetic domain.

8. A circular magnetic domain device as claimed in claim 2 wherein the detection means also include concentration means for causing the generated wave to concentrate along at least one path in the said layer between the generating and detection transducers, the said at least one wave concentration path being arranged such that the wave concentration intercepts at least one domain propagation path.

9. A circular magnetic domain device as claimed in claim 8 wherein the generated waves are magnetic waves and wherein the concentration means consist of a pattern formed in the surface topography of the major surface of the said layer, the said pattern defining at least one path.

10. A circular magnetic domain device as claimed in claim 8 wherein the generated waves are acoustic waves and wherein the concentration means include a pattern of a material having elastic properties that are dissimilar to the elastic properties of the material of the said layer, the said pattern defining at least one path and being formed on the major surface of the said layer.

11. A circular magnetic domain device as claimed in claim 10 wherein the pattern is of a material selected from the group which comprises silica, nickel and nickel-iron.

* * * * *